UNITED STATES PATENT OFFICE.

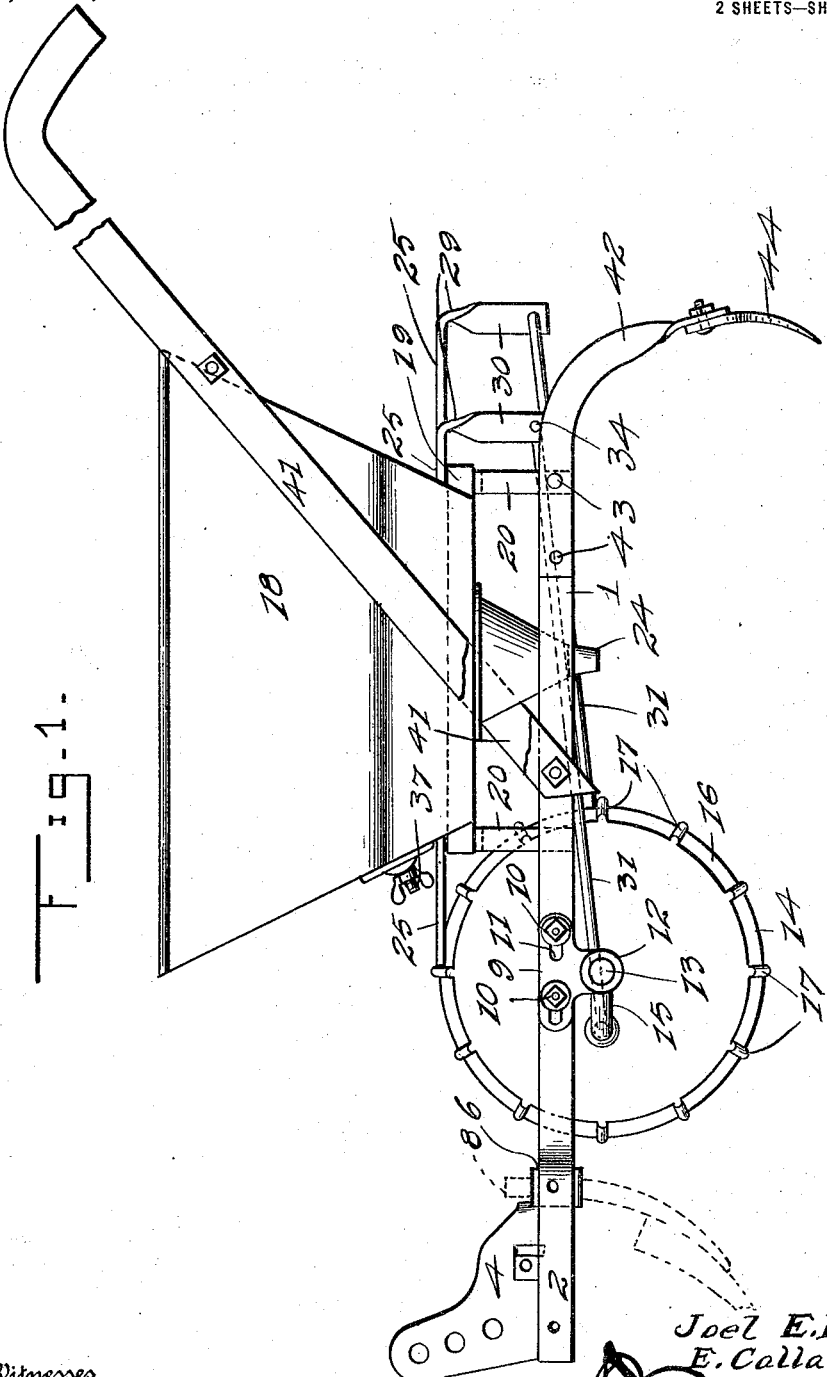

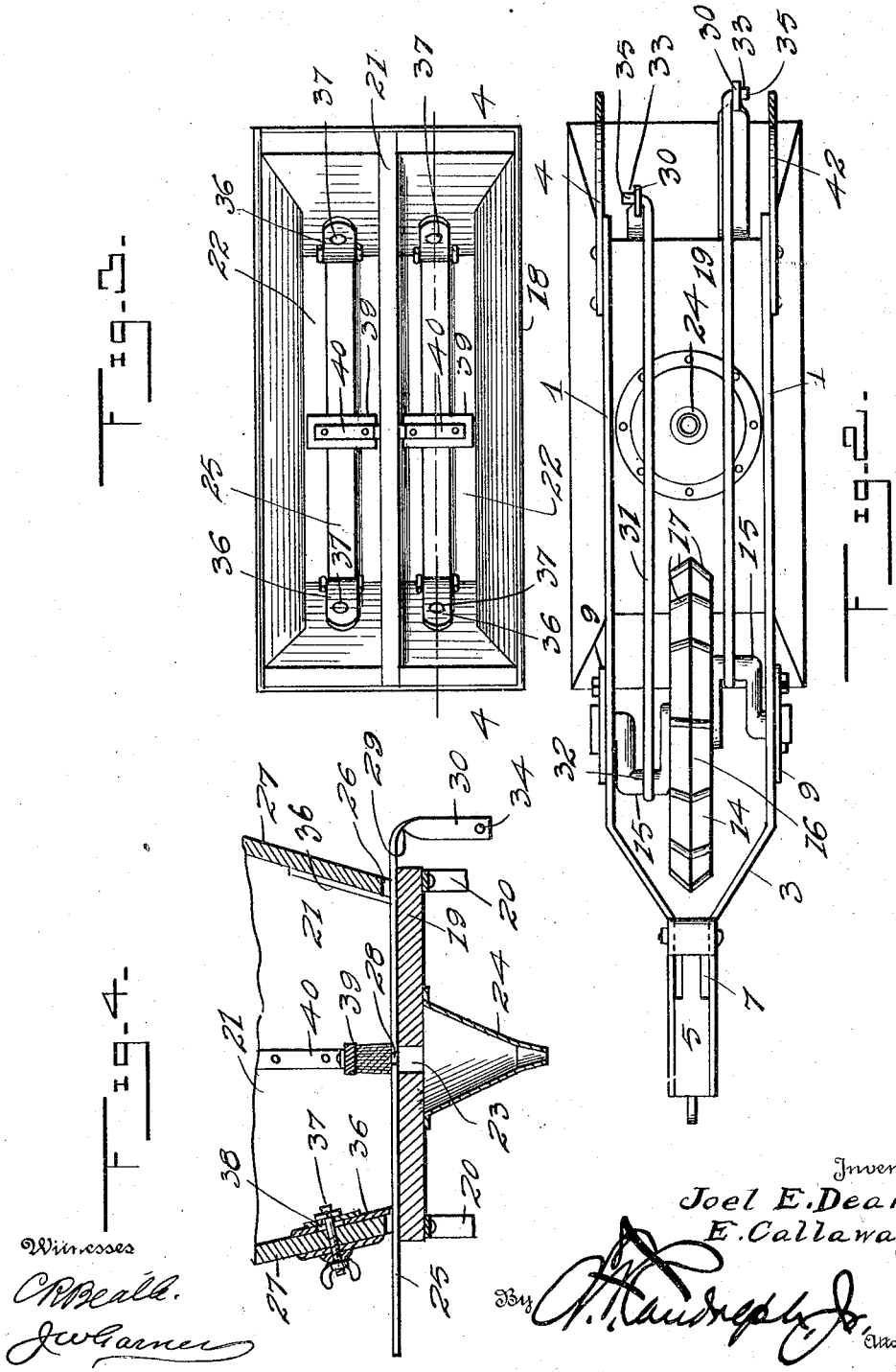

JOEL E. DEAN, JR., AND EUGENE CALLAWAY, OF BACONTON, GEORGIA, ASSIGNORS OF ONE-THIRD TO J. B. MILLER, OF BACONTON, GEORGIA.

PLANTER.

1,191,875.       Specification of Letters Patent.     Patented July 18, 1916.

Application filed August 20, 1915. Serial No. 46,575.

*To all whom it may concern:*

Be it known that we, JOEL E. DEAN, Jr., and EUGENE CALLAWAY, citizens of the United States, residing at Baconton, in the county of Mitchell and State of Georgia, have invented certain new and useful Improvements in Planters; and we do hereby declare the following to be a full, clear, and exact description of the invention, such as will enable others skilled in the art to which it appertains to make and use the same.

This invention is an improved double planter adapted for use in planting two kinds of seeds alternately in the drills and for dropping the seeds at any desired distance apart, and also adapted for planting one kind of seed, if desired, the object of the invention being to provide an improved planter of this type which is extremely cheap and simple in construction, is strong and durable, and in which the seed dropping bars are removable readily and are interchangeable at will.

The invention consists in the construction, combination and arrangement of devices hereinafter described and claimed.

In the accompanying drawings: Figure 1 is a side elevation of a planter constructed in accordance with this invention. Fig. 2 is an inverted plan of the same. Fig. 3 is a plan of the hopper with the seed dropping bars also indicated. Fig. 4 is a vertical sectional view of the hopper, the spout, one of the seed dropping bars and one of the brushes.

The frame of the planter comprises a pair of longitudinally arranged bars 1 which have their front ends 2 arranged close together by offsets 3 formed in the bars, the said front ends of the bars being bolted on opposite sides of a clevis 4, the clevis having a base portion 5 provided, near its rear end, with channels 6 for the reception of the bars and being also provided with vertical openings 7 to enable a suitable standard to be attached, if desired and for carrying a furrow opening shovel or other suitable device. This standard with a shovel thereon is shown at 8 in dotted lines in Fig. 1. Bearing brackets 9 are secured on the outer sides of the bars 1 near the front ends of said bars, by bolts 10 which pass through longitudinal slots 11 with which said bearing brackets are provided so that said brackets may be adjusted longitudinally as desired. The brackets are provided with bearings 12 for the axle 13 of a wheel 14 to run in the furrow or drill and the said axle is provided on opposite sides of the wheel with oppositely extending cranks 15. The wheel is provided with an oppositely beveled periphery 16 and also with lugs 17 to engage in the soil and cause the wheel to be positively rotated when the planter is drawn forwardly. The hopper 18 is provided with a bottom 19 which is secured on the bars 1 above said bars, by inverted U-shaped bars 20, said bars being bolted to the bars 1 and also under the bottom at the ends of the latter. The hopper is provided with a central and longitudinally arranged partition 21 to form compartments 22 in opposite sides of the hopper. The bottom 19 of the hopper is provided with an opening 23 at the center of each compartment and to the under side of the hopper bottom is secured a funnel shaped seed spout 24 into which both of the seed openings 23 discharge. A pair of reciprocatory seed dropping bars 25 are also provided, one for operation in the bottom of each hopper compartment, said bars being movable on the upper side of the hopper bottom and guided in openings 26 at the lower sides of the end walls 27 of the hopper. Each seed dropping bar is provided with one or any suitable number of seed openings 28 according to the kind of seeds to be planted and arranged, if more than one of said openings are employed they may be arranged at any required distance apart, according to the desired distance between the hills or planted spaces in the drills. The said seed dropping bars are in practice made of flat bar iron or steel, at very slight expense and any suitable number of the said seed bars will be provided for the planter, according to the desired kinds of seeds to be planted, the distances between the hills and other varying conditions, each seed dropping bar being provided with one or any suitable number of openings 28. Each bar 25 has its rear end twisted at right angles as at 29 and bent downwardly to form a vertical arm 30. Rods 31 have their front ends provided with eyes 32 and mounted on the wrists of the cranks 15 and have their ends bent outwardly at right angles as at 33 and pivotally mounted in openings 34, in the arms 30 and detachably held thus connected by suitable cotter pins or other like devices 35.

It will be understood that when the machine is in motion the rotation of the crank axle causes the rods 31 to impart reciprocating motion to the seed dropping bars and to move the seed dropping bars alternately in reverse directions so that the seeds from the respective compartments of the hopper are planted in alternate hills.

Plates 36 bear on the upper sides of the bars 25 and close the upper portions of the openings 26, to prevent seeds from passing out through said openings. These plates are adjustably secured in place by set screws 37 which operate in slots 38 with which the plates are provided.

A brush 39 bears on each seed dropping bar 25 at a point above the opening 23, the brushes causing the openings 28 to become only filled with seeds during the movement of the bars so that when the opening 28 gets under a brush the seeds from said opening drop through the opening 23 into the spout 24 and from the latter into the furrow or drill. The brushes are here shown as secured to opposite sides of the partition wall 21 by angle irons 40.

Suitable handle bars 41 are secured to the hopper and to the bars 1. Standards 42 are secured to the rear portions of the bars 1 by bolts 43 and may be provided with covering shovels, teeth or plates 44 of any suitable size and construction.

In practice any suitable number of seed dropping bars may be provided for use in the hopper, according to the kinds of seeds to be planted and the desired distance between the hills. The seed dropping bars may be readily manufactured at very slight cost and may be readily installed and removed.

While we have herein shown and described a preferred form of our invention we would have it understood that changes may be made in the form, proportion and construction of the several parts without departing from the spirit of the invention and within the scope of the appended claim.

Having thus described our invention, we claim:—

In a planter of the class described a frame comprising a pair of side bars arranged for the attachment of earth working implements thereto, a clevis having a base arranged and secured between the front ends of said bars, the said clevis being provided with means for the attachment of the standard of an earth working implement thereto, bearings secured to the bars of the frame, an operating wheel having a double crank shaft mounted in said bearings, a hopper having a pair of longitudinally arranged seed compartments, supporting means for the hopper and secured to the bars of the frame and mounting the hopper above the frame, seed dropping bars arranged one in the bottom of each hopper compartment for longitudinal reciprocating movement, extending entirely through the hopper and each provided at its rear ends with a depending arm arranged exteriorly of the hopper, and pitman rods connecting said arms to the cranks of the crank shaft.

In testimony whereof we affix our signatures in presence of two witnesses.

JOEL E. DEAN, Jr.
EUGENE CALLAWAY.

Witnesses:
J. G. KINKLAND,
E. A. McCALLUM.

Copies of this patent may be obtained for five cents each, by addressing the "Commissioner of Patents, Washington, D. C."